(No Model.)
G. M. STOCK.
VEHICLE MOTOR.
No. 584,169. Patented June 8, 1897.
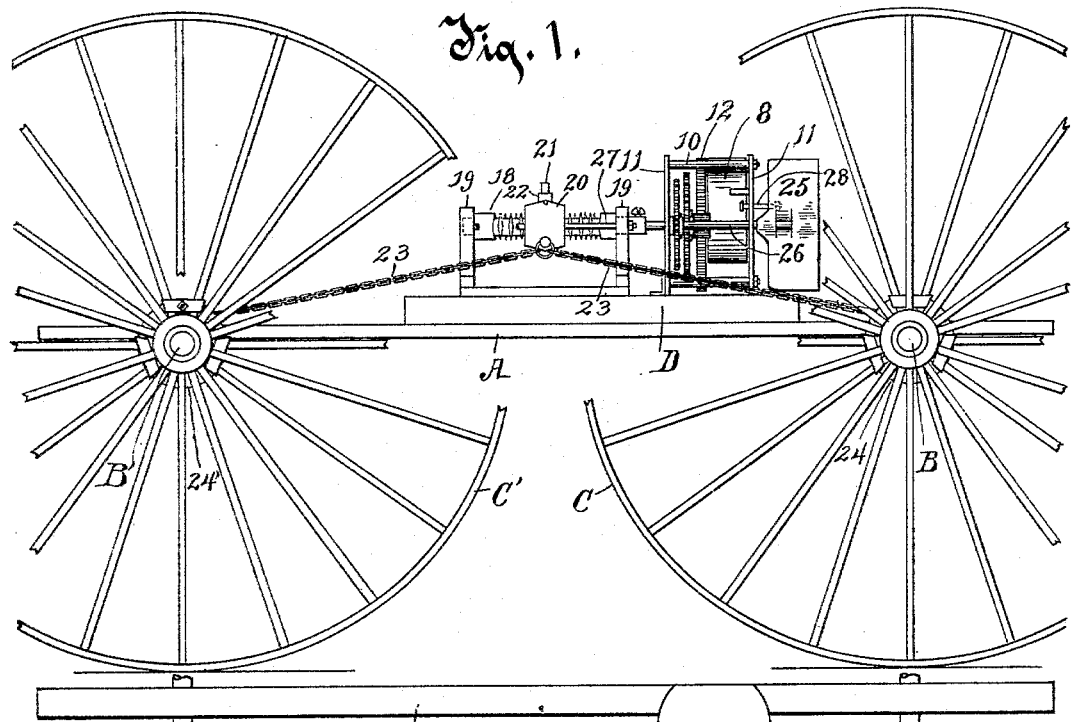
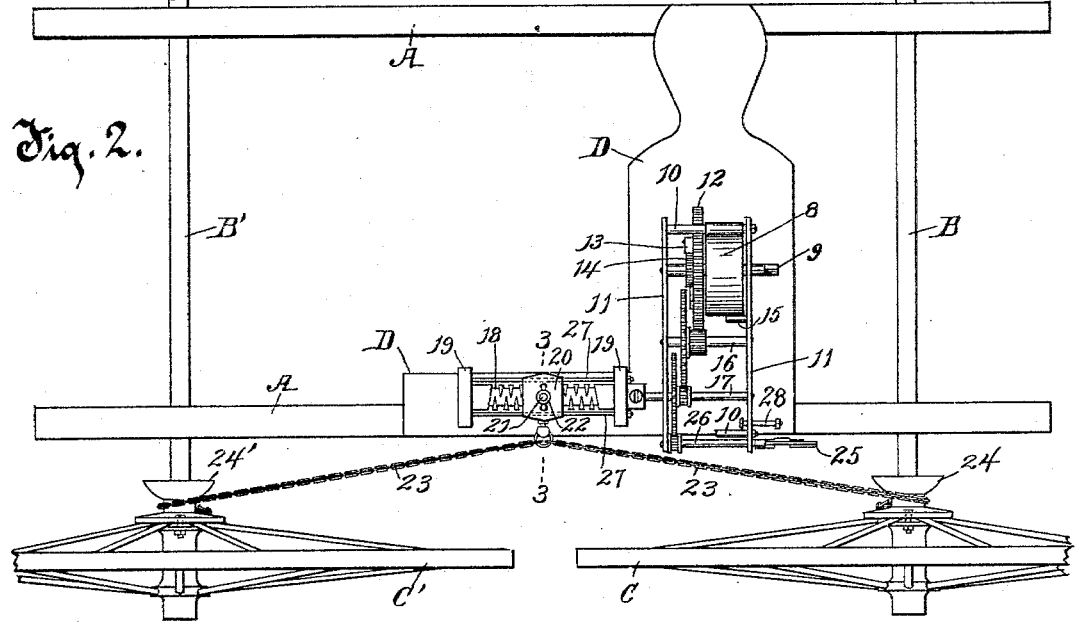
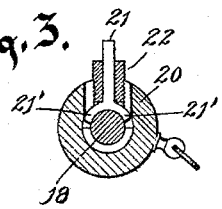
Witnesses.
C. N. Keeney.
Anna V. Faust.
Inventor.
George M. Stock
By Benedict & Morsell
Attorneys.

UNITED STATES PATENT OFFICE.

GEORGE M. STOCK, OF MILWAUKEE, WISCONSIN, ASSIGNOR OF ONE-HALF TO MATHIAS SCHNEIDER, OF SAME PLACE.

VEHICLE-MOTOR.

SPECIFICATION forming part of Letters Patent No. 584,169, dated June 8, 1897.

Application filed January 21, 1897. Serial No. 620,107. (No model.)

*To all whom it may concern:*

Be it known that I, GEORGE M. STOCK, of Milwaukee, in the county of Milwaukee and State of Wisconsin, have invented a new and useful Improvement in Vehicle-Motors, of which the following is a description, reference being had to the accompanying drawings, which are a part of this specification.

The object of my invention is to provide an improved motor adapted for propelling a vehicle, and especially to reciprocate a light vehicle—such, for instance, as a baby-carriage—back and forth in a straight line on the floor of a room. Such a motor attached to and in combination with a baby-carriage is a great convenience in that it can be wound up, thus storing the energy by which the carriage is to be made to travel, and can at a subsequent time be released or put in operation at the will of the attendant.

The invention consists of the mechanism, its parts, and combination of parts, as hereinafter described and claimed, or their equivalents.

In the drawings, Figure 1 is a side elevation of my improved mechanism or motor attached to the running parts of a baby-carriage, such portions of the running-works of the carriage being shown as is necessary to exhibit the relations of the motor to the carriage. Fig. 2 is a top plan view of my improved motor in connection with the running-works of the baby-carriage shown in Fig. 1. Fig. 3 is a central vertical section on line 3 3 of Fig. 2.

In the drawings, A A are the side-bars or reaches of the running-works of a baby-carriage.

B B' are the axles, and C C' are a front and rear wheel respectively of the carriage, it being understood that there are corresponding wheels (not shown) on the other ends of the two axles. These wheels are preferably fixed on the axles and the axles are journaled on the reaches or other parts of the frame of the running-works of the vehicle. The wheels might, however, be loose on the axles, as is common in some vehicles of this class.

The driving medium or power for operating the motor is a coiled spring 8, secured at its inner end to the arbor 9 and at its outer end to the fixed post 10. The arbor 9 is mounted revolubly in a frame consisting of the side plates 11 11, secured together parallel with each other at a distance apart by a required number of posts 10. A large spur-wheel 12, loose on the arbor 9, is held to rotate therewith in one direction by a spring-held click 13, pivoted to the side of the wheel, which click engages in one direction the rack-toothed pinion 14, fixed on the arbor 9. This construction permits of the winding up of the spring without rotating the wheel 12, but compelling rotation of the wheel 12 with the arbor 9 as the spring unwinds. A stud-post 15, fixed in a plate 11, prevents the undue expansion of the spring at that side of the arbor. The wheel 12 meshes with a pinion fixed on shaft 16, and a cog-wheel on the shaft 16 meshes with a pinion on the driving-shaft 17. The shafts 16 and 17 are mounted revolubly in the plates 11 of the frame. The shaft 17 is secured axially releasably to the reversely-threaded screw 18, which is mounted in suitable standards 19 19. The standards 19 and the frame 11 are fixed on a platform D, secured to the side-bars A. A sleeve 20 is reciprocable freely on the fixed rod-guides 27 and over the reversed screw 18. A pin 21, inserted freely in the sleeve 20, being conveniently held in place loosely by the plug-nut 22, turning into the sleeve, rides in the grooves of the reversely-threaded screw, being advisably provided with furcate ends 21', curved downwardly to fit on the body of the screw within the grooves thereof. As the screw revolves continuously this pin 21 follows the thread in one direction to the end of the screw, and is there shifted laterally slightly by the terminating shoulders of the screw and travels in the groove thereof in the reverse direction to the other end of the screw, and is there correspondingly shifted and again reverses the direction of the travel of the sleeve. A chain or flexible cord 23, secured medially to the sleeve 20, extends thence in opposite directions to and winds on the spools 24 24', fixed respectively on the hubs of the wheels C and C'. It will be understood that as the sleeve 20 travels reciprocally first in one direction and then in the other the chain 23 will pull and unwind on one of the spools 24 24', compelling the axle and the wheels thereon to revolve, thus causing the carriage to travel, and at the same time the other extremity of the chain will be wound up on the other spool, and that when the sleeve 20 has reached the limit of its travel in that direction it will automatically reverse its motion, and will thereby pull on and unwind from the other spool, compelling the carriage to travel in the reverse direction. To regulate the motion of the machinery and especially to cause it to operate with uniform speed, it is desirable to have a governor connected to the operative mechanism, and any form of governor in common use may be used as a cheap and convenient device for this purpose, but I preferably employ fans 25, fixed on a shaft 26, which shaft is provided with a pinion that meshes with a spur-wheel on shaft 17. This device is a simple one and will serve as a satisfactory governor of the mechanism.

Any convenient means may be provided for preventing the unwinding of the spring and the working of the clock mechanism when said clock mechanism is wound up and the vehicle is not in use. In the drawings I have shown a pin 28, which is adapted to be passed through one of the side pieces 11 and may be thrust laterally far enough to come in contact with the governor-fan 25 and thereby stop the clock mechanism. When it is desired that the clock mechanism should operate, the pin is pushed in in the opposite direction far enough to permit the fan to rotate.

If it is desired that the vehicle should be propelled independent of the motor mechanism—as, for instance, when it is desired to take the baby-carriage out on the street—the hooks at the ends of the chains are merely disengaged from the spools 24 24' and said hooks connected to staples or equivalent devices on the sides of the vehicle.

What I claim as my invention is—

1. A motor for reciprocating a vehicle, comprising an actuating-spring, a train of wheels, a reversely-threaded screw, a sleeve about the screw reciprocable on a rod guide or guides, the rod guide or guides, and a chain or cord attached to and extending in opposite directions from the sleeve and winding on spools on and concentric with wheels of the vehicle.

2. In a motor for reciprocating a vehicle, a reversely-threaded screw mounted on the frame of the vehicle, a sleeve reciprocable on a guide and over the screw, a pin connecting the sleeve actively to the screw, a chain or cord connected to the sleeve and extending in opposite directions therefrom to and winding on spools on the wheels of the vehicle, and means for operating the screw.

3. The combination with a reversely-threaded screw, of a sleeve reciprocable on a guide over the screw, a pin loose in the sleeve, said pin having a furcate extremity riding on the screw in the grooves thereof, and a chain or cord connecting the sleeve to and winding on spools on and concentric with the wheels of a vehicle.

4. The combination with the wheels and frame of a vehicle, of an actuating-spring, a train of wheels, a governor connected operatively to the train of wheels, a reversely-threaded screw, a sleeve about the screw reciprocable on a rod-guide, and chains or cords attached to the sleeve and extending in opposite directions therefrom and winding on spools on and concentric with the wheels of the vehicle.

In testimony whereof I affix my signature in presence of two witnesses.

GEORGE M. STOCK.

Witnesses:
ARTHUR L. MORSELL,
ANNA V. FAUST.